US009551610B2

United States Patent
Bilgen et al.

(10) Patent No.: US 9,551,610 B2
(45) Date of Patent: Jan. 24, 2017

(54) SENSOR FOR REMOTELY POWERED UNDERWATER ACOUSTIC SENSOR NETWORKS (RPUASN)

(71) Applicants: Semih Bilgen, Ankara (TR); Alper Bereketli, Ankara (TR)

(72) Inventors: Semih Bilgen, Ankara (TR); Alper Bereketli, Ankara (TR)

(73) Assignee: Semih Bilgen, Ankara (TR)

( * ) Notice: Subject to any disclaimer, the term of this patent is extended or adjusted under 35 U.S.C. 154(b) by 825 days.

(21) Appl. No.: 13/956,625

(22) Filed: Aug. 1, 2013

(65) Prior Publication Data

US 2015/0036463 A1 Feb. 5, 2015

(51) Int. Cl.
*G01H 3/00* (2006.01)
*G01V 1/02* (2006.01)

(52) U.S. Cl.
CPC .. *G01H 3/00* (2013.01); *G01V 1/02* (2013.01)

(58) Field of Classification Search
CPC ........ G01S 15/04; G01S 15/104; G01S 15/42; G08B 13/1609; G08B 31/00; G10K 11/346

USPC .......................................................... 367/133
See application file for complete search history.

(56) References Cited

U.S. PATENT DOCUMENTS

2011/0007606 A1\* 1/2011 Curtis ..................... G01S 15/04
367/103

\* cited by examiner

*Primary Examiner* — Luke Ratcliffe
(74) *Attorney, Agent, or Firm* — Gokalp Bayramoglu

(57) ABSTRACT

A Remotely Powered Underwater Acoustic Sensor Networks (RPUASN) paradigm and the node architecture for RPUASN are disclosed. In RPUASN, sensor nodes harvest and store power supplied by an external acoustic source, extending their lifetime indefinitely. Necessary source characteristics are determined. The ability of an RPUASN sensor to harvest its required power is disclosed with respect to source parameters and distance to the source. Performance of RPUASN is directly related to the sensing coverage and communication connectivity over the field the sensor nodes are deployed. The required number of RPUASN nodes and the volume which is guaranteed to be covered by the nodes is disclosed in terms of electrical power, range, directivity and transmission frequency of the external acoustic source, and node power requirements.

9 Claims, 13 Drawing Sheets

US 9,551,610 B2

SENSOR FOR REMOTELY POWERED UNDERWATER ACOUSTIC SENSOR NETWORKS (RPUASN)

TECHNICAL FIELD

This invention is about a sensor structure that enables remote powering of underwater acoustic sensor networks (UASN).

BACKGROUND

Sensors constitute a connection between the physical medium and industrial electrical/electronic devices. These devices are used in many industrial processes such as control, security, and monitoring.

Today, it is possible to mention hundreds of sensor types manufactured. Sensors can be categorized according to many different criteria such as the magnitude measured, output power, power requirements, etc.

Active sensors require an external energy supply. They generally operate on a battery or an accumulator. However, the main problem of sensor networks is energy constraint.

In the state of the art on this technique, the invention mentioned in the U.S. Pat. No. 7,835,226 B2, it is proposed to perform communication and powering in wireless sensor networks through a pipe.

Another patent document in the state of the art is WO 2008/058076 A1. The invention presented in this document is about supplying energy to the underground sensors used in petroleum and gas extraction, and about wireless communication.

SUMMARY

The objective of this invention is to construct a sensor architecture that enables remote powering of underwater acoustic sensor networks without using batteries or accumulators.

With this invention, it is going to be possible to use sensor networks with relatively indefinite lifetime in all types of underwater sensing applications [1] such as meteorology, fishing, and military applications, and the technical capabilities of these systems will be enhanced.

Since the power supply (battery, accumulator, etc) of each sensor in sensor networks is limited, the lifetime of sensor networks is constrained. Conventional sensor network technologies are constrained by the high priority need to take this energy and lifetime restriction into account. In conventional technologies, sensors used to be designed to have the least possible energy consumption in all processes (sensing, communication) in order to delay running out of the energy source.

With the novel system and method used in the sensor structure proposed in the present invention, the lifetime of sensor networks is prolonged infinitely by their remote powering from a high-frequency acoustic source.

BRIEF DESCRIPTION OF THE DRAWINGS

The figures and related explanations used for the detailed description of the sensor for remotely powered underwater acoustic sensor networks developed with this invention are as follows.

DESCRIPTION OF THE ELEMENTS/UNITS/PARTS FORMING THE INVENTION

For a better explanation of the RPUASN sensor developed in this invention, the parts and units in the figures are numbered, and the description of each number is as follows.

1. Harvesting Unit
   1.1 Hydrophone
2. Power Unit
   2.1 DC Converter
   2.2 Capacitor
3. Control, Sensing, and Processing Unit
4. Communication Unit
   4.1 Data Receiver
   4.2 Data Transmitter
   4.3 Transducer

DETAILED DESCRIPTION OF THE PREFERRED EMBODIMENTS

Sensor Architecture:

While power harvesting from many different sources have been considered in the literature [2], no work has yet explicitly addressed the needs of Underwater Acoustic Sensor Networks (UASN).

In the proposed network architecture, Remotely Powered Underwater Acoustic Sensor Network (RPUASN) nodes are fed by an external acoustic source. Voltage is induced on the receiver of a passive node, and it is converted to DC. The DC power can either be used to operate the sensor node or kept in a storage capacitor for later use.

Figure 1:
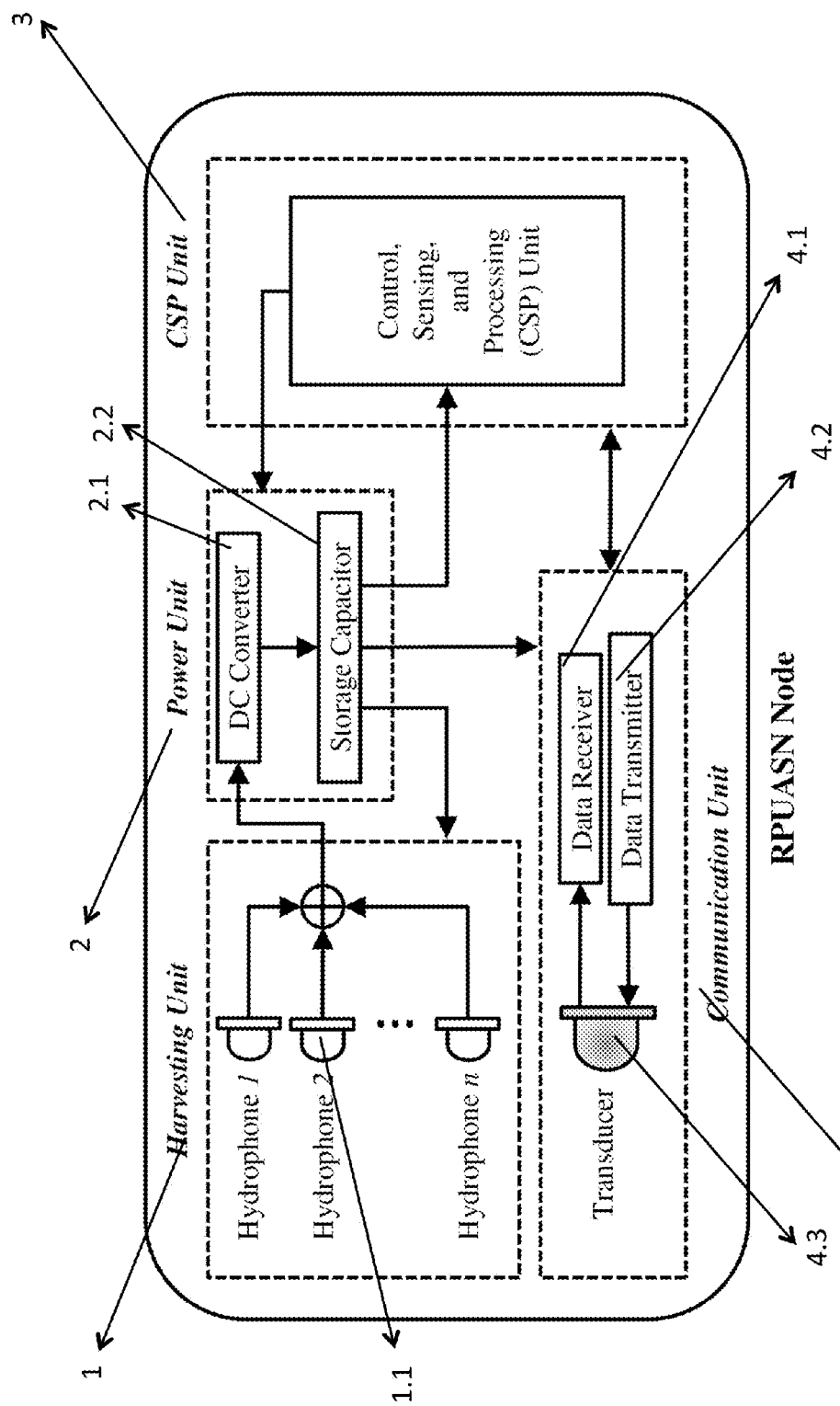
FIG. 1 Building blocks of an RPUASN node

A typical RPUASN node hardware is depicted in FIG. 1. The node architecture consists of four fundamental units. The control, sensing and processing (CSP) unit performs sensing and data processing. The exchange of information among RPUASN nodes is achieved through the communication transducers. The harvesting unit consists of an array of n hydrophones [3]. The total harvested power is accumulated in the power unit which consists of a DC converter and a reservoir capacitor. The hydrophones used in the harvesting unit are selected according to the sensitivity level (RVS) at the transmission frequency of the source.

Figure 2:
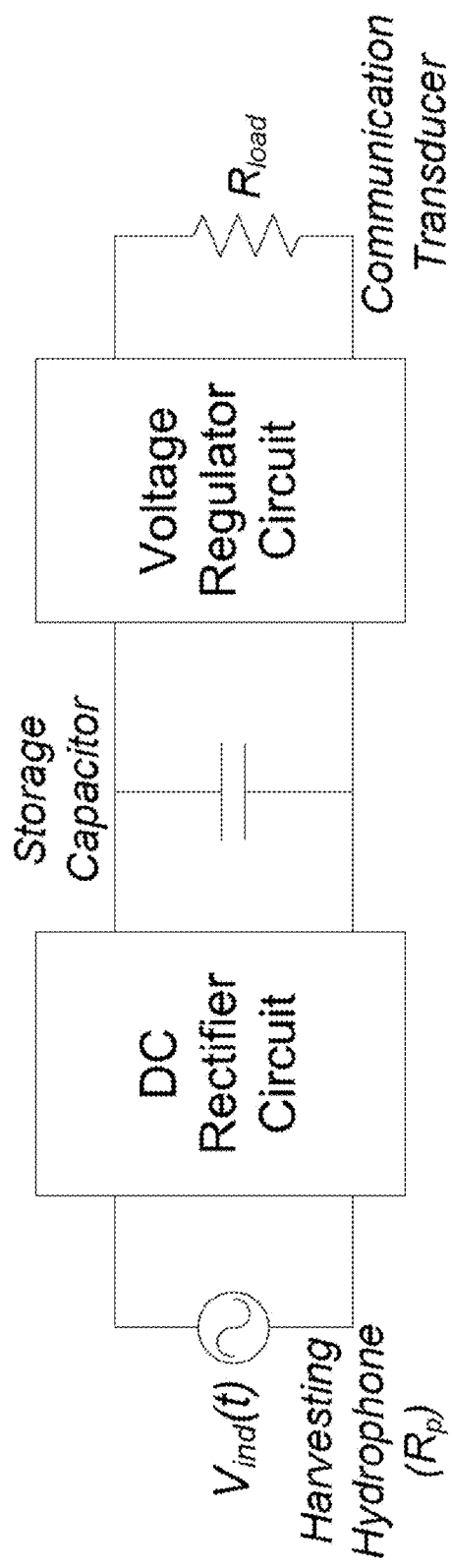
FIG. 2 The model for the piezoelectric material and the power harvesting circuit FIG. 3 Harvested power for electrical input power and distance of the source FIG. 4 Variation of the harvested power with frequency and distance FIG. 5 Harvested power with distance at various source directivities FIG. 6 RPUASN deployed in a spherical volume FIG. 7 RPUASN nodes deployed in a spherical cone for a circular piston source FIG. 8 Radius of the sphere for source power and frequency FIG. 9 Height of the spherical cone for varying source power and transmission frequency FIG. 10 Number of nodes in spherical deployment for varying source power FIG. 11 Number of nodes in spherical cone for varying source power FIG. 12 Variation of the number of sensors with sensing range for spherical region FIG. 13 Variation of the number of sensors with sensing range for spherical cone

The electrical behavior of a piezoelectric material is modeled as an induced AC voltage $V_{ind}(t)$ (FIG. 2). Power is harvested by connecting the piezoelectric material to the storage capacitor via a rectifier or multiplier circuit. The duty cycle of the harvester circuit may be controlled through a voltage regulator circuit [4]. Since the instantaneous power level stored in the reservoir capacitor may be low, the regulator circuit may also be used to release the stored power in burst mode.

Sensor Power Budget:

The source level, SL, in dB re 1 µPa at 1 m, of an underwater acoustic transmitter is given by $$SL = 170.8 + 10 \log_{10} P_{elec} + 10 \log_{10} \eta + DI \qquad (1)$$

where DI is the directivity index of the source in dB, and $P_{elec}$ is the electrical input power at the source [5]. The electro-acoustic power conversion efficiency η varies between 0.2 and 0.7 for typical sonar transmitters [3], [5]. Assuming deep water characteristics and neglecting reflection from the air and bottom surfaces throughout the analysis, combining absorption and spherical spreading loss, the total attenuation level (AL) in dB is [3]:

$$AL = 20 \log_{10} R + \alpha(f) R \qquad (2)$$

where R is the propagation range in m. The absorption coefficient α(f) in dB/m increases with frequency and depends on the characteristics of the propagation medium [6]. The difference $$RL = SL - AL \qquad (3)$$

gives the received level (RL) in dB at a sensor whose distance to the source is R. Then, the acoustic pressure p on the hydrophone is $$p = 10^{RL/20} \qquad (4)$$

which generates voltage at its open circuit terminals. Receiving voltage sensitivity (RVS) of a hydrophone, that accounts for the efficiency of converting incident sound energy to electrical energy, is defined as $$RVS = 20 \log_{10} M \qquad (5)$$

in terms of sensitivity M in V/µPa [5]. Using (4) and (5), the RMS induced voltage is expressed as $$V_{ind} = pM = (10^{RL/20})(10^{RVS/20}) \qquad (6)$$

According to the well-known maximum power transfer theorem, load power in FIG. 2 is maximized if the magnitude of the load impedance ($R_{load}$) is the same as that of the harvesting hydrophone ($R_p$). Furthermore, when n hydrophones are connected in series to achieve a higher total induced voltage ($nV_{ind}$), the total impedance is multiplied by n. Hence, the maximum power available from n hydrophones is $$P_{available} = \frac{(nV_{ind})^2}{4nR_p} = n \frac{V_{ind}^2}{4R_p} \qquad (7)$$

where $P_{available}$ is in Watts.

Power losses in recently designed piezoelectric harvesting circuits have become very small compared to the input power, leading to improved efficiencies between 60% and 85% [4]. By substituting Eq. (6) into Eq. (7) and assuming a realizable harvesting efficiency of 70%, the total power harvested at an RPUASN node with n hydrophones can be obtained as $$P_{harv} = 0.7 n \frac{10^{(RL+RVS)/10}}{4R_p} \qquad (8)$$

Numerical Examples for Feasibility of RPUASN:

From the relationships established in the previous section, it can be quantitatively shown that using only commercially available components and devices, underwater sensors can be operated over indefinite lifetimes via remote acoustic powering. In the examples below, the electro-acoustic conversion efficiency of the projector at the source is taken as 50%. Unless otherwise stated, $R_{load} = R_p = 125Ω$ and an RPUASN node includes n=5 hydrophones with sensitivity RVS=−150 dB re V/µPa at the operating frequency of the external acoustic source [5], [7].

A. Input Electrical Power and Source-to-Node Distance

Figure 3:
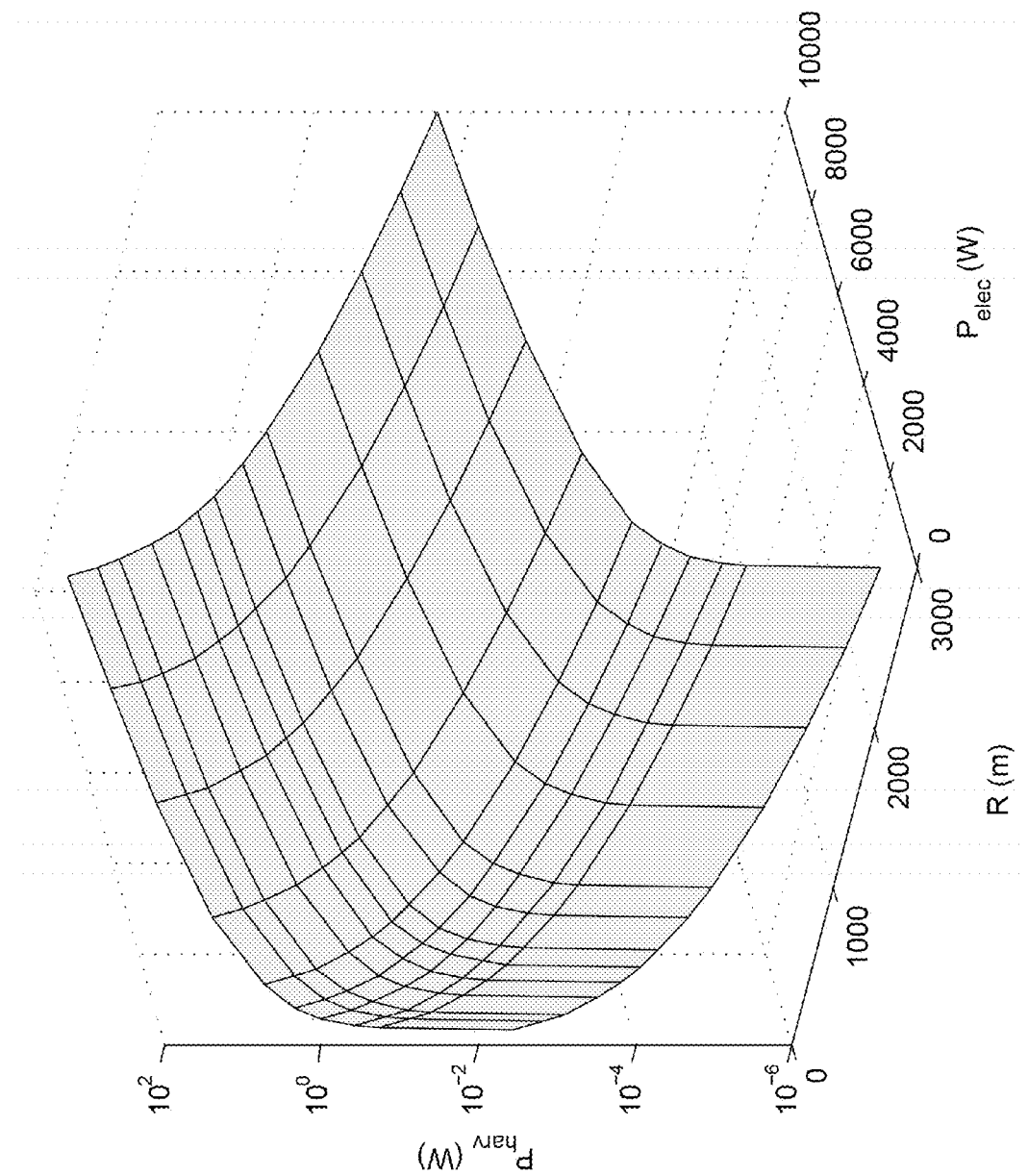

In this example, source frequency f=10 kHz. The source is directional with a DI of 20 dB, which is achievable through a circular piston or disc type projector [3]. As shown in FIG. 3, up to a distance of 800 m, the power harvested on each sensor reaches the order of Watts with a source consuming less than 2 kW of electrical power. In Section 5.2 below, it will be shown that 100 such nodes, each operating with 200 mW [8] may be powered by a single source to achieve 1-coverage over the full range.

B. Harvested Power and Source Frequency

Figure 4:
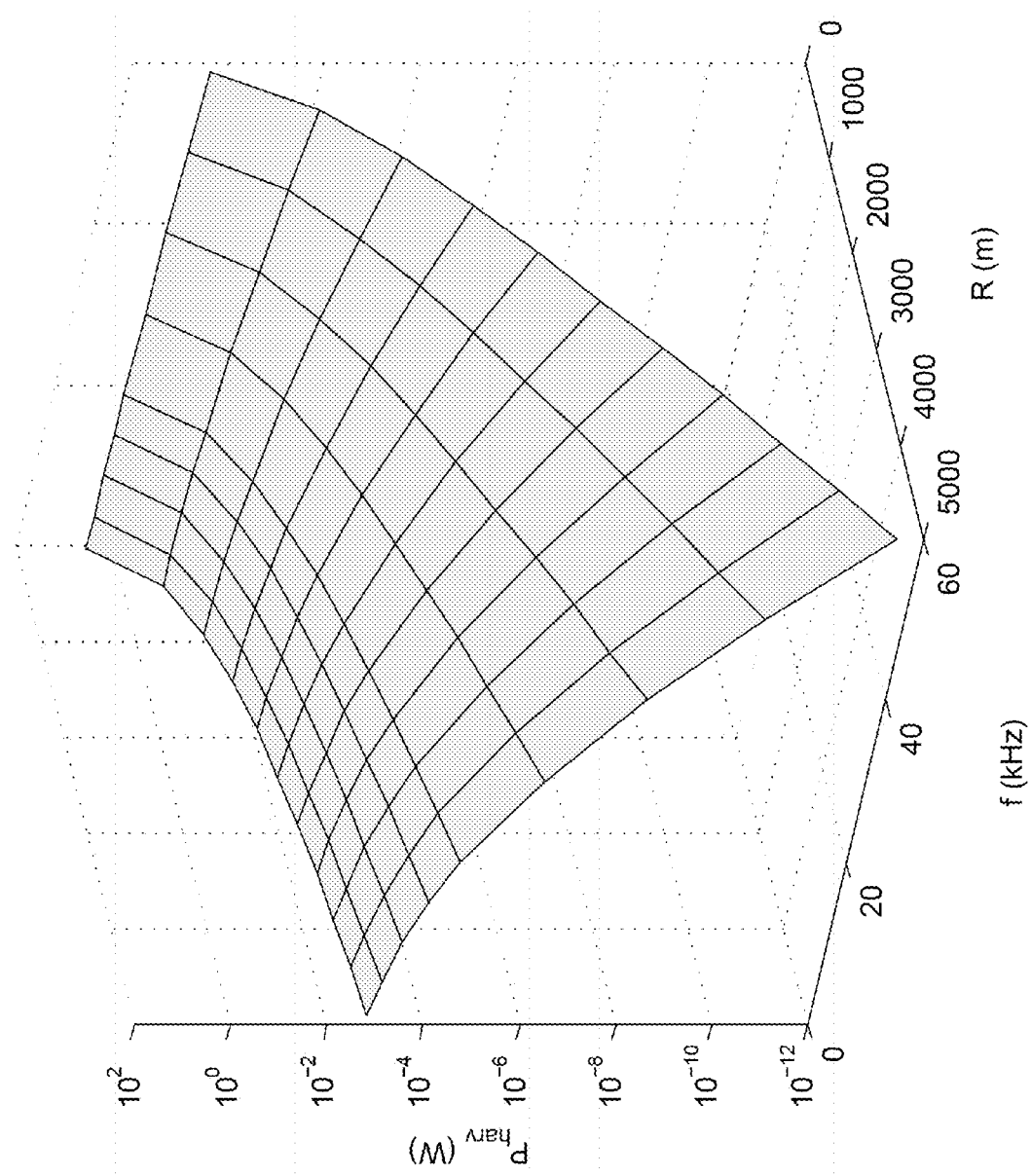

The change in the harvested power with frequency is investigated for various R values. In FIG. 4, a directional source transmits with DI=20 dB and $P_{elec}$=1 kW. $P_{harv}$ is almost constant at low frequencies up to f=20 kHz. However, for frequencies above 20 kHz, the effect of absorption [6] begins to dominate for R greater than 1 km, reducing the harvested power, as expected from (2).

C. The Effect of Source Directivity on Harvested Power

Figure 5:
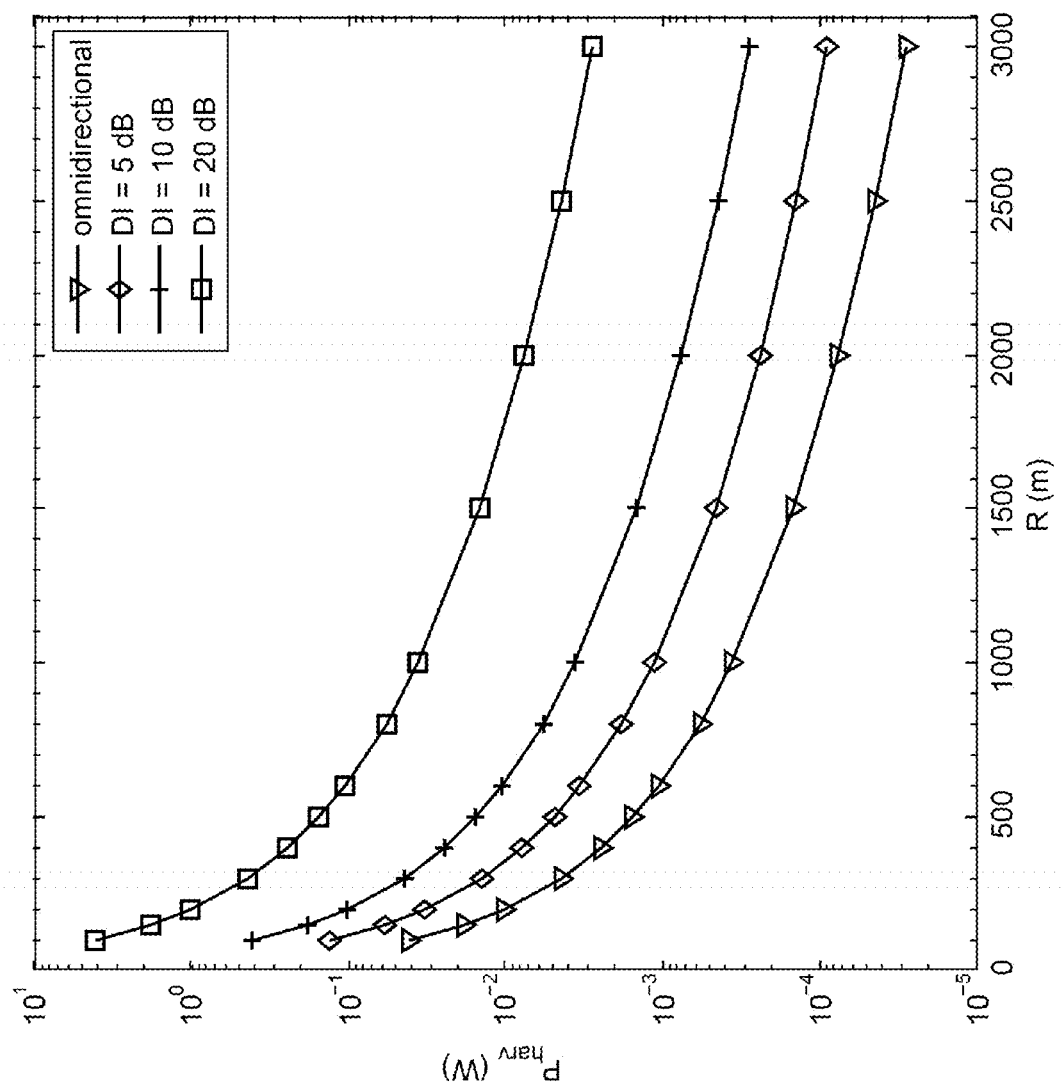

To investigate the effect of directivity, $P_{harv}$ is plotted against R for various DI values, as shown in FIG. 5. In this case, $P_{elec}$=1 kW and f=10 kHz. In order to provide an RPUASN node with the power level it requires [8], an omnidirectional external acoustic source should be kept closer to the RPUASN node than a directional source.

Network Coverage and Connectivity:

In RPUASN, event data must be reliably sensed and communicated to a remote sink via sensor nodes. Therefore, in order to guarantee sensing coverage and communication connectivity, it is important to carefully design the RPUASN deployment according to source and node characteristics.

Coverage describes the monitoring quality of a sensor network, and k-coverage implies that every location in the network is monitored by at least k nodes. In order to cover a three dimensional region efficiently while maintaining network connectivity for any given random node deployment, it is vital to estimate the appropriate sensing range, transmission range, and node density. We assume that N nodes are deployed randomly and uniformly in a three dimensional region of volume V. Then, each node must have a minimum sensing range ($r_s$) given by $$r_s = \left[ \frac{-\ln(1-\delta)V}{\frac{4\pi N}{3}} \right]^{1/3} \qquad (9)$$

where δ is defined as the coverage fraction, which determines the probability that a point in the network is within the sensing range of at least one sensor [9]. It is shown in [10]

that "radius . . . ($r_s$) required to achieve a sensing-covered network is greater than the transmission range . . . ($r_t$) required to have a connected network." In agreement with [11] we assume that typically, $r_t \geq r_s$, and 1-coverage implies connectivity for a given number of nodes in RPUASN. Therefore, the rest of our study is based on the minimum $r_s$ to achieve 1-coverage for given N and V.

To provide coverage and connectivity in the network, harvested power given by (8) should satisfy the minimum power requirement ($P_{req}$) of an RPUASN node. Using an external acoustic source transmitting with directivity DI and input electrical power $P_{elec}$ at frequency f, the maximum range at which an RPUASN node can harvest $P_{req}$ is denoted as $R_{max}$. For this configuration, the equation for $P_{req}$ can be obtained by inserting the open form for (3) into (8) as follows:

$$P_{req} = \frac{0.7n}{4R_p} 10^{0.1[170.8+DI+10\log_{10}(P_{elec}\eta/R_{max}^2)-\alpha(f)R_{max}+RVS]} \qquad (10)$$

Rearranging (10) gives the following condition for the maximum range $R_{max}$:

$$\alpha(f)R_{max} + 20\log_{10}R_{max} = 170.8 + DI + 10\log_{10}\frac{0.7nP_{elec}\eta}{4R_pP_{req}} + RVS \qquad (11)$$

Figure 6:
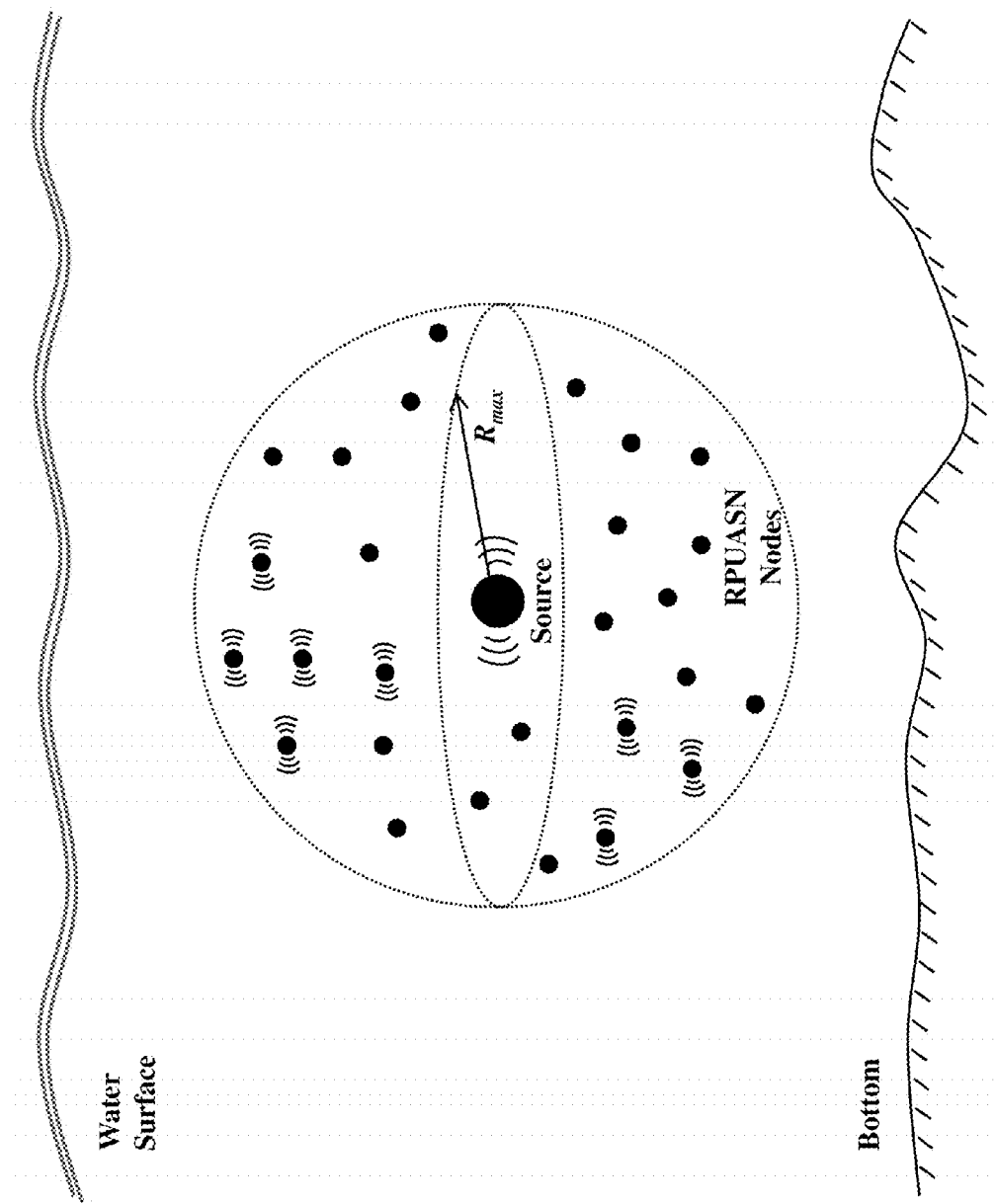

We consider two possible deployment scenarios. In the first scenario, RPUASN nodes are dispersed around an omnidirectional acoustic source, as shown in FIG. 6. With the valid assumption of spherical spreading in deep water [3], the source is able to supply the power, $P_{req}$, required by the RPUASN nodes deployed within a spherical region of radius at most $R_{max}$. In this case, (9) can be written as:

$$r_s = \left[\frac{-\ln(1-\delta)\frac{4\pi}{3}R_{max}^3}{\frac{4\pi N}{3}}\right]^{1/3} = \left[\frac{-\ln(1-\delta)}{N}\right]^{1/3}R_{max} \qquad (12)$$

which gives the relation between the radius of the deployment region and sensing range for 1-coverage.

Figure 7:
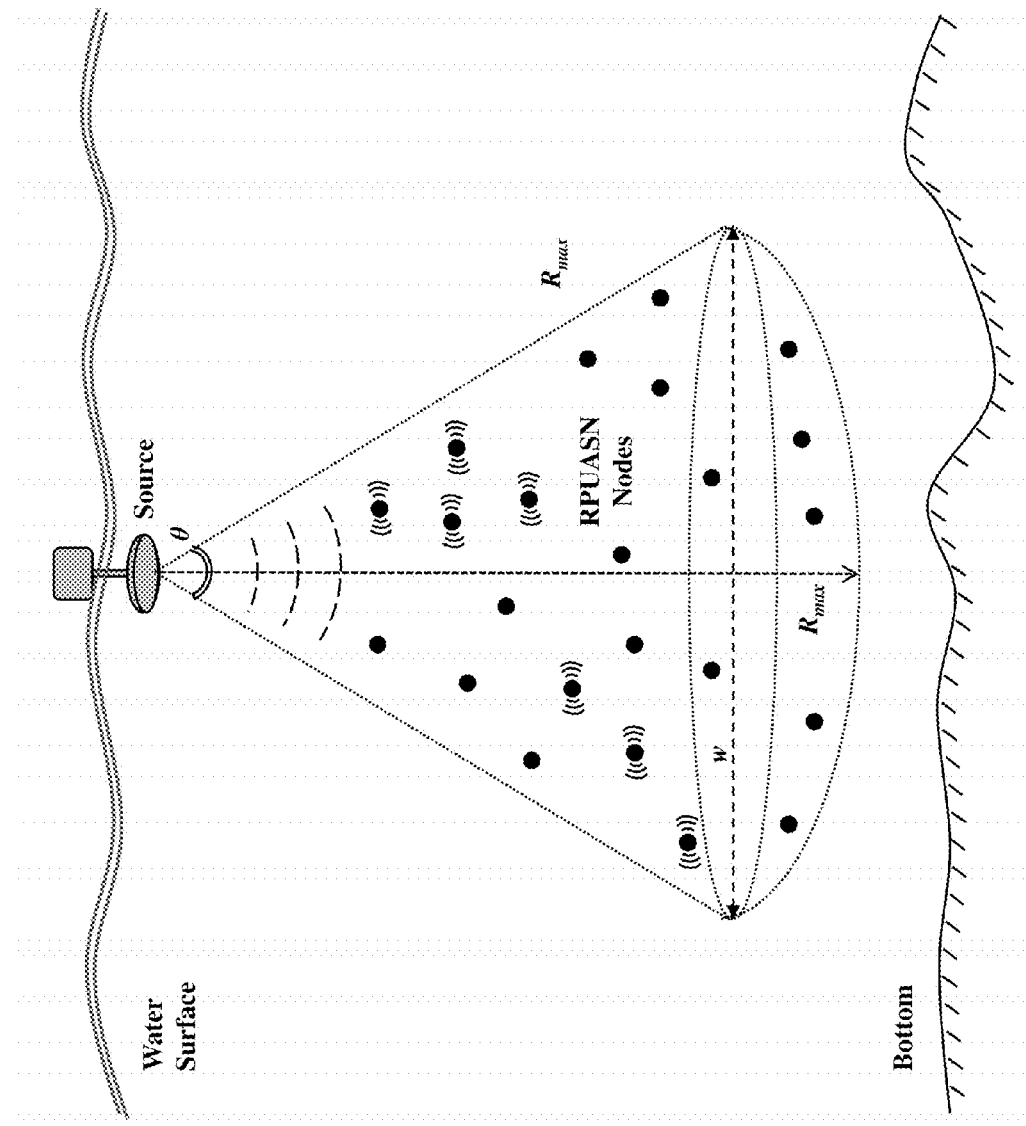

The second deployment scenario is presented in FIG. 7. The source is assumed to be a circular piston type projector [5], for which directivity index is related to the vertex angle of acoustic transmission ($\theta$) by $$DI = 20\log_{10}\frac{60\pi}{\theta} \qquad (13)$$

The directed source can supply RPUASN nodes with $P_{req}$ at ranges no greater than $R_{max}$, and hence, it allows for a deployment volume in the shape of a spherical cone with vertex angle $\theta$ and width w, which is the diameter of the spherical cap of the cone. The expression for the minimum sensing range $r_s$ of a node is $$r_s = \left[\frac{-\ln(1-\delta)\frac{2\pi}{3}R_{max}^3\left(1-\cos\frac{\theta}{2}\right)}{\frac{4\pi N}{3}}\right]^{1/3} \qquad (14)$$

-continued $$= \left[\frac{-\ln(1-\delta)}{2N}\left(1-\cos\frac{\theta}{2}\right)\right]^{1/3}R_{max}$$

for guaranteed sensing coverage, and hence communication connectivity.

Consequently, (11) and either (12) or (14) can be used for these two deployment scenarios to determine appropriate design parameters for RPUASN with guaranteed coverage and connectivity, as will be shown in the numerical examples. As in the previous section, $\eta$=50%, $R_{load}=R_p=125\Omega$, n=5, and RVS=−150 dB re V/μPa at the source frequency [5], [7]. The required number of nodes is analyzed for a coverage fraction of $\delta$=0.999 [9]. The power characteristics of sensors are based on commercially available nodes and modems. In particular, we consider $P_{req}$=0.2 W [12], [13], $P_{req}$=0.5 W [8], and $P_{req}$=1 W [14] to account for typical power requirements of RPUASN nodes. The external acoustic source is omnidirectional for spherical deployment (FIG. 6), whereas DI=20 dB for conic deployment, representing a spherical cone with $\theta$=20°, as shown in FIG. 7.

A. Volume Powered by the External Acoustic Source

Figure 8:
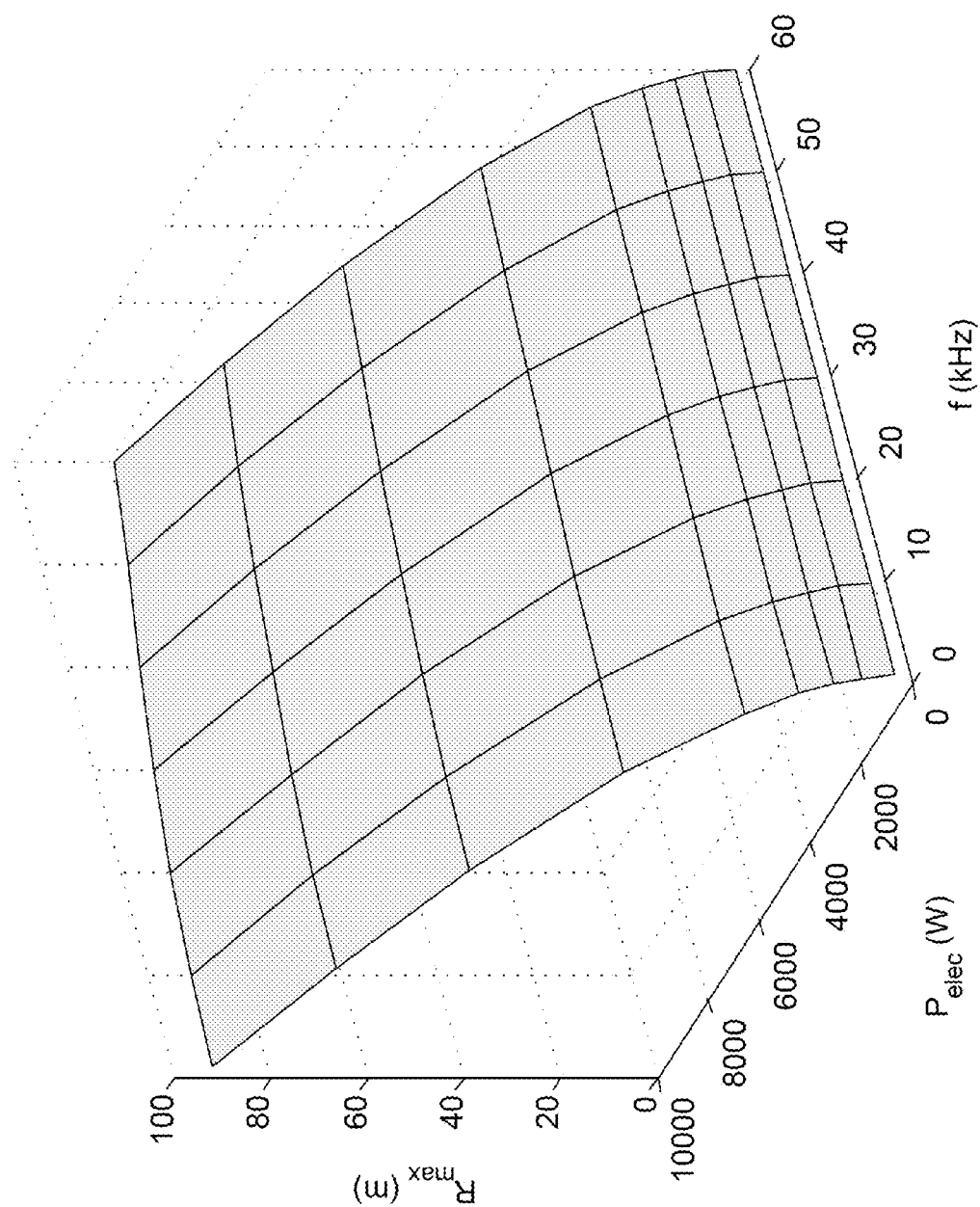

When the source is omnidirectional, the radius of the sphere in which RPUASN nodes can be deployed is given by (11). For $P_{req}$=0.5 W, the source can power nodes at a distance up to $R_{max}$=100 m for varying $P_{elec}$ at different frequencies, as illustrated in FIG. 8. At short ranges the propagation loss is dominated by spreading but not absorption [6]. Therefore, frequency does not have a major effect for spherical deployment. On the other hand, $R_{max}$ increases from 3 m to 100 m for $P_{elec}$ ranging between 1 W and 10 kW.

Figure 9:
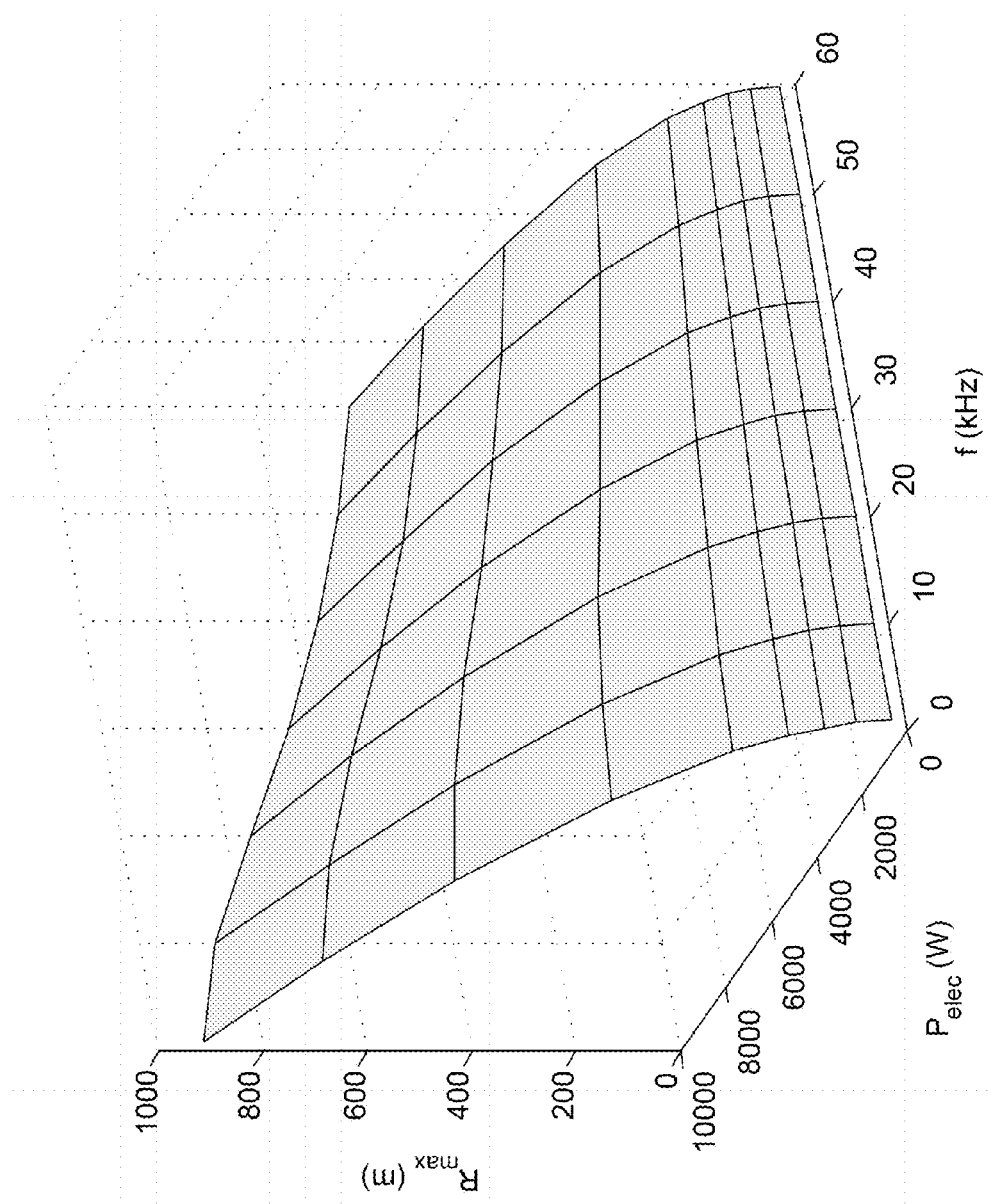

$R_{max}$ stands for the height of the spherical cone when the source is a circular piston with DI=20 dB. The variation of $R_{max}$ with $P_{elec}$ and f for this case, again with $P_{req}$=0.5 W, is shown in FIG. 9. As compared to FIG. 8, the effect of absorption is now more visible with frequency, since the source is able to transmit at longer ranges such as 900 m. Combined with directivity, the source transmits at a higher acoustic power intensity, and $P_{elec}$ has a bigger impact on $R_{max}$. Moreover, for the $R_{max}$ ranges shown in FIG. 9, the spherical cone reaches a width of w=320 m. These results show that it is practical to monitor a large volume with sensor nodes powered by a directed acoustic source.

B. Number of Nodes and Source Power

Figure 10:
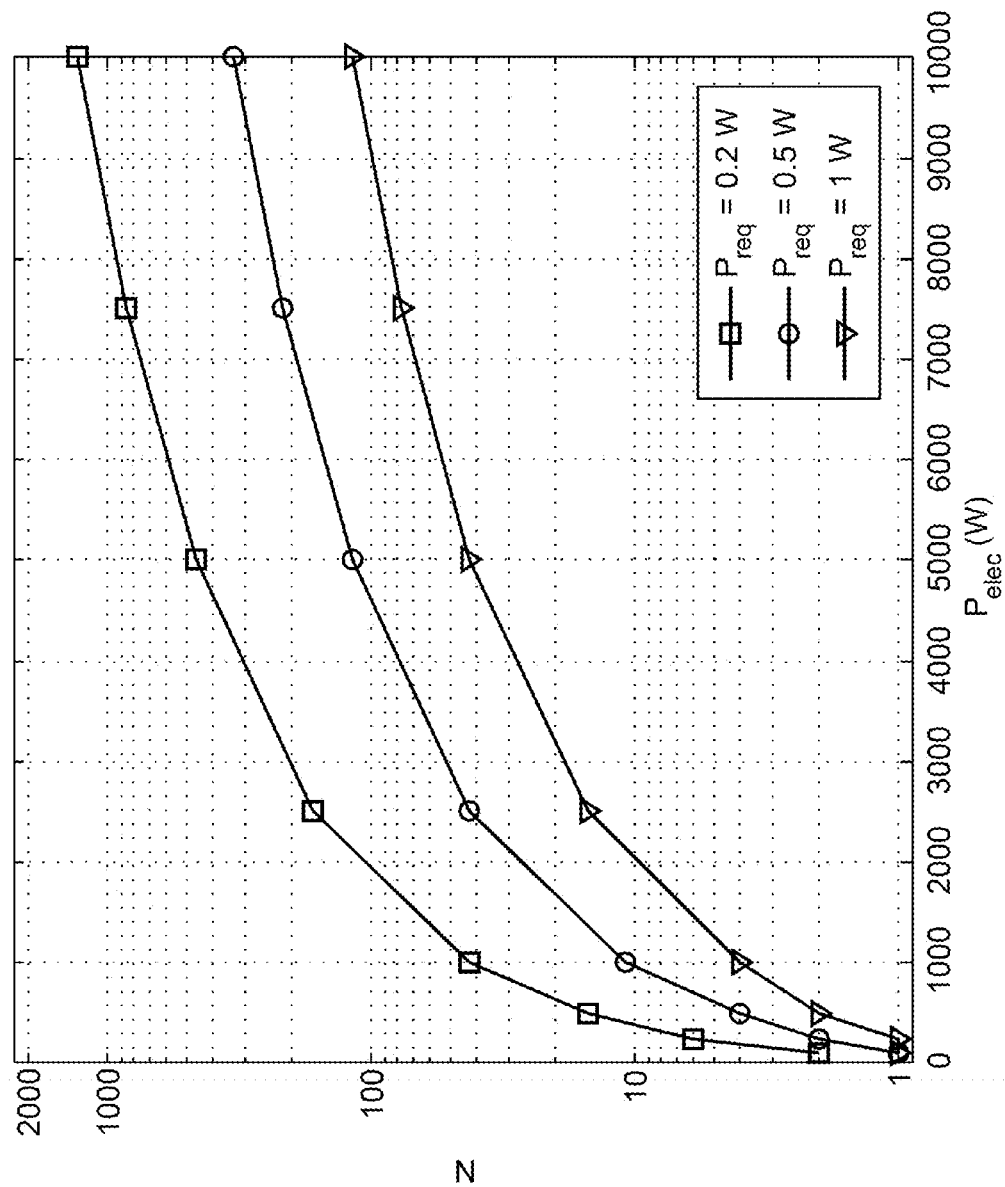
Figure 11:
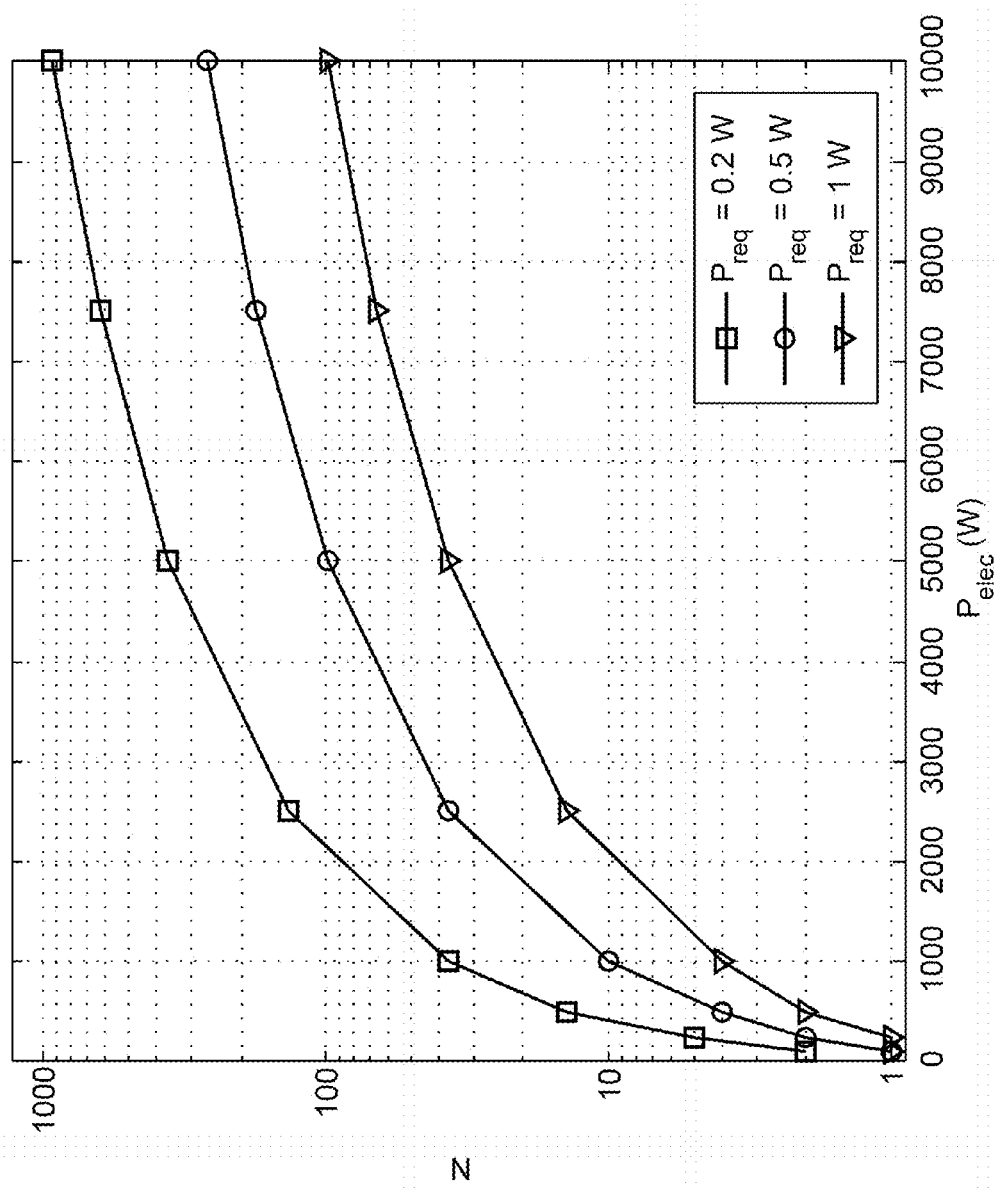

The number of sensors, N, needed for 1-coverage in spherical and conical deployment scenarios are plotted against source power in FIG. 10 and FIG. 11, with $r_s$ set to 25 m and 50 m, respectively [9]. When $P_{elec}$ is increased, the source supplies power to a longer range. As a result, the volume of the sphere in which nodes are deployed increases. Increasing the network size necessitates coverage and connectivity over a larger region, and this implies a higher number of nodes, since the range of each node is limited by $r_s$. Hence, N stands for the minimum number of sensors that may be powered by a source consuming the electrical power, $P_{elec}$, to achieve 1-coverage within its full range.

FIGS. 10 and 11 show that increasing $P_{req}$ requires a stronger source to supply power to a given number of sensors if the source-to-sensor distances remain the same. A stronger source can supply an increased number of nodes with a certain $P_{req}$ to achieve 1-coverage within the full source range.

C. Number of Nodes and Sensing Range

An event field can be covered by a smaller number of RPUASN nodes if the sensing range of nodes is increased.

Figure 12:
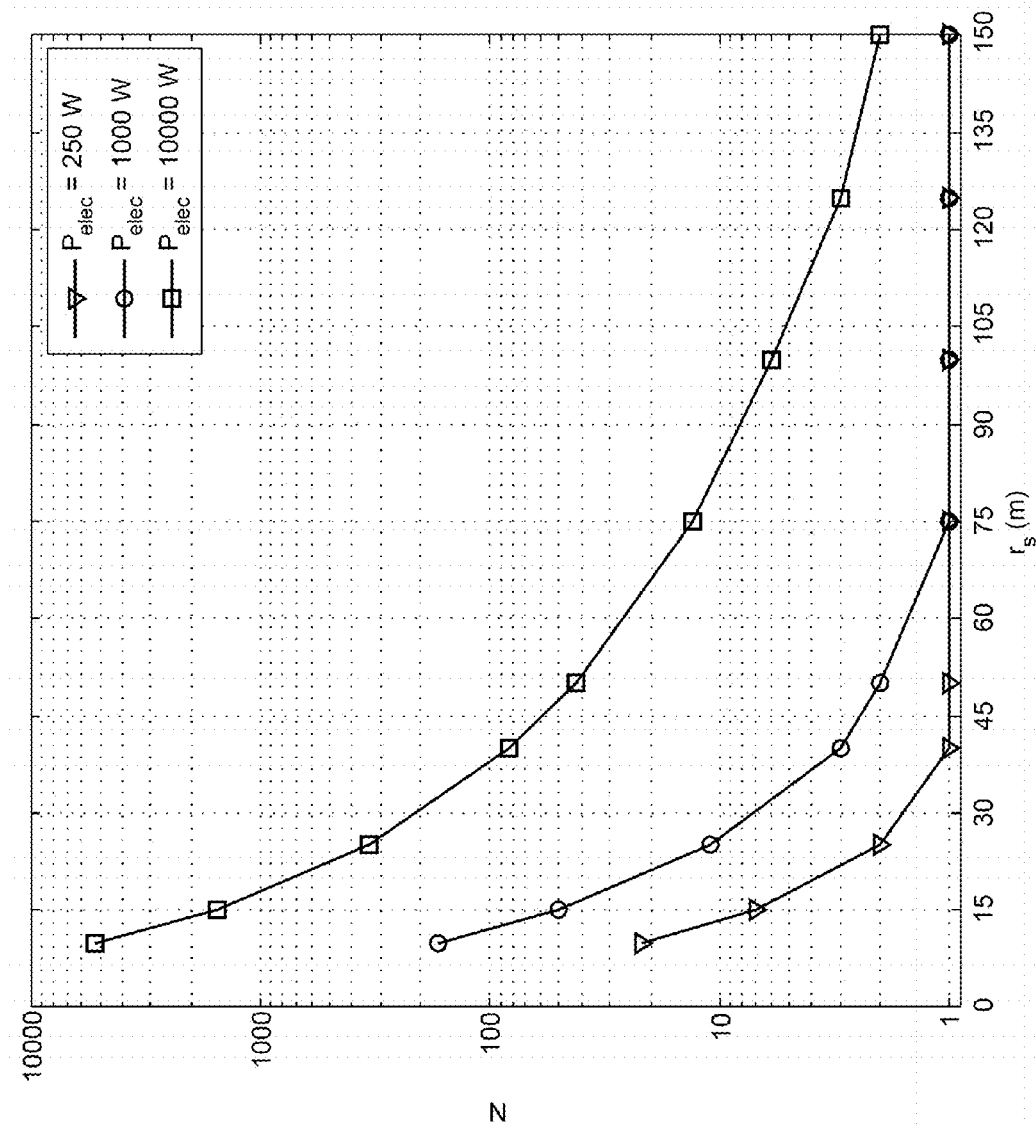
Figure 13:
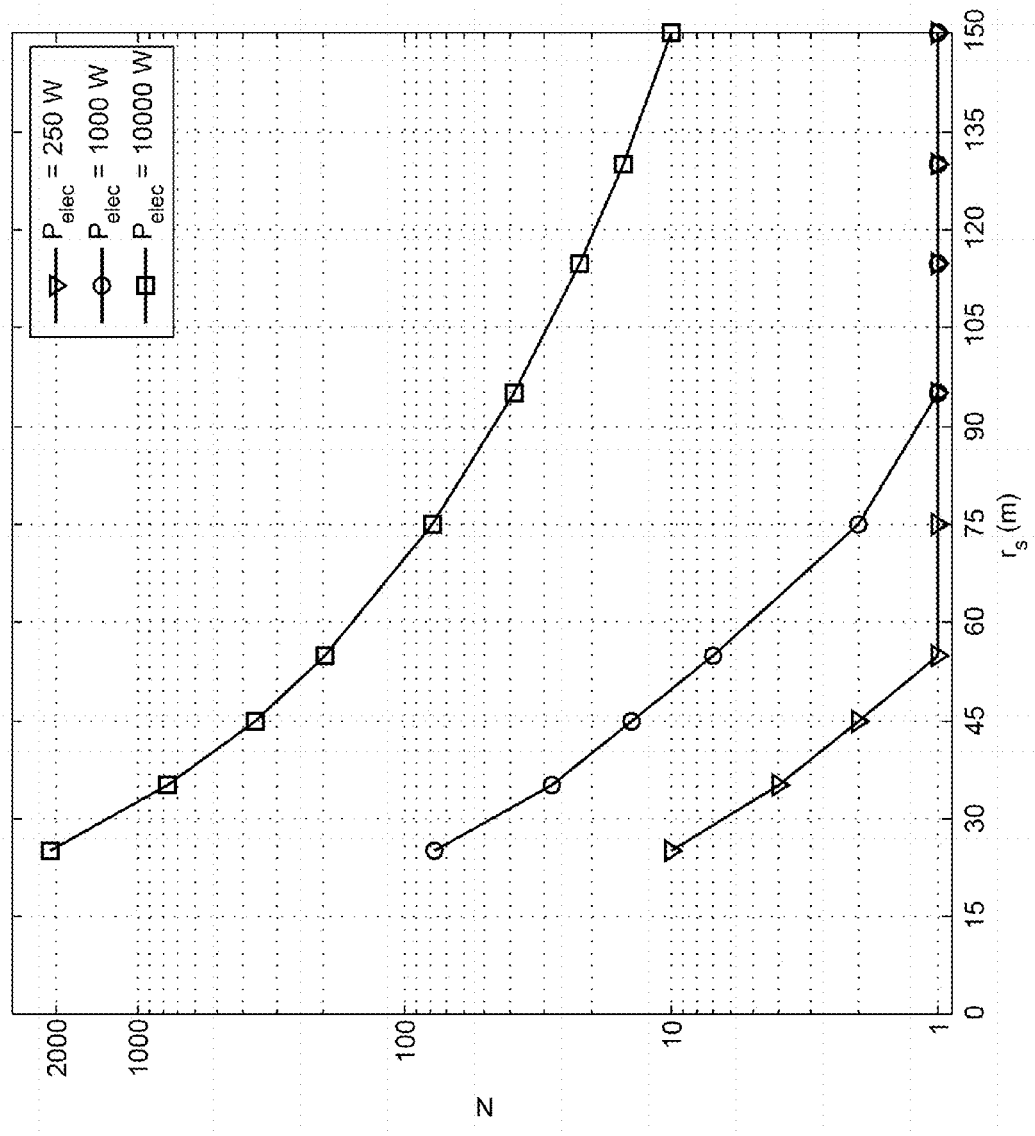

In FIG. 12 and FIG. 13, the selected $r_s$ values are based on commercially available components and $P_{req}$ is assumed to be 0.5 W [8]. Using a higher source power enables a higher number of nodes with a given sensing range, $r_s$, providing 1-coverage within a larger volume.

The results for the spherical cone scenario are plotted in FIG. 13. Transmitting with DI=20 dB, the source reaches a longer $R_{max}$ and allows for a larger deployment region, enabling a higher number of nodes achieving 1-coverage over that volume in comparison to FIG. 12.

These examples show that it is practically possible to achieve 1-coverage and connectivity in a given volume powered by a given acoustic source with a feasible number of commercially available ([7]-[9], [12]-[14]) sensor nodes.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A sensor for enabling remote acoustic powering of underwater acoustic sensor networks (UASN), comprising:
   a harvesting unit (1), including at least one hydrophone (1.1);
   a power unit (2), including a DC Converter (2.1) and a capacitor (2.2);
   a control, sensing, and processing unit (3), configured for sensing and data processing; and
   a communication unit (4), including a data receiver (4.1), a data transmitter (4.2), and a transducer (4.3);
   wherein the power unit is connected to the harvesting unit, the control, sensing and processing unit, and to the communication unit; the at least one hydrophone (1.1) is selected according to the receiving voltage sensitivity (RVS) level at an acoustic transmission frequency of an external acoustic source remote from the sensor, wherein the external acoustic source is configured to provide power to the sensor.

2. The sensor of claim 1, wherein the number of hydrophones (1.1) in the harvesting unit (1) is determined according to the power requirements of sensor units and the power requirement and the communication range of the transducer.

3. The sensor of claim 1, wherein the capacitor (2.2) in the power unit is selected according to the type of operation and the duty cycle of the sensor.

4. The sensor of claim 1, wherein the operating frequency of the transducer in the communication unit is different from the transmission frequency of the external acoustic source.

5. The sensor of claim 1, wherein the impedance of the transducer in the communication unit is matched to the power circuit for maximum power transfer in the power unit (2).

6. The sensor of claim 1, wherein the hydrophone directivity in the harvesting unit is determined according to the power and transmission direction of the external acoustic source.

7. The sensor of claim 1, wherein the hydrophone in the harvesting unit is omnidirectional in the spherical and conical network applications.

8. The sensor of claim 1, wherein the directivity of the transducer is determined according to the power of the external acoustic source and direction of communication.

9. The sensor of claim 1, wherein the transducer (4.3) is an omnidirectional transducer in the spherical and conical network applications.

* * * * *